Dec. 22, 1942.  R. H. SULLIVAN ET AL  2,306,002
VOLTAGE TRANSFORMATION APPARATUS
Filed Oct. 2, 1933  3 Sheets-Sheet 1

INVENTORS
Raymond H. Sullivan
William H. Hutchins
Cyril T. Wallis
BY
Spencer Hardman
ATTORNEYS Dec. 22, 1942.  R. H. SULLIVAN ET AL  2,306,002
VOLTAGE TRANSFORMATION APPARATUS
Filed Oct. 2, 1933   3 Sheets-Sheet 2

INVENTORS
Raymond H. Sullivan
William H. Hutchins
Cyril T. Wallis
BY
*Spencer Hardman and Fehr*
ATTORNEYS Dec. 22, 1942.  R. H. SULLIVAN ET AL  2,306,002
VOLTAGE TRANSFORMATION APPARATUS
Filed Oct. 2, 1933   3 Sheets-Sheet 3
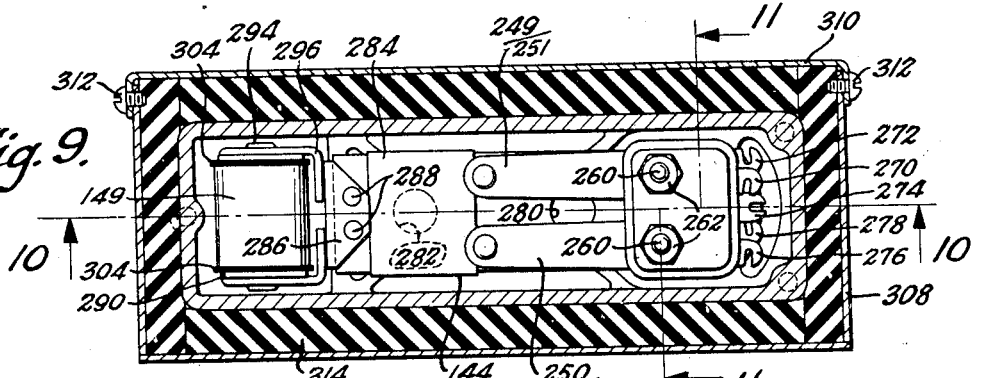
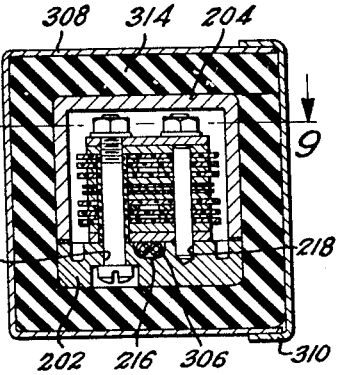
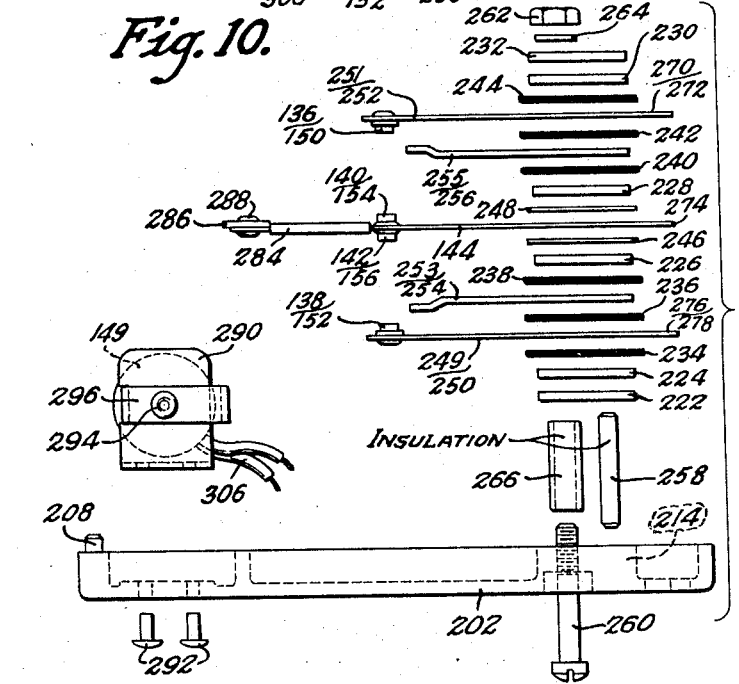
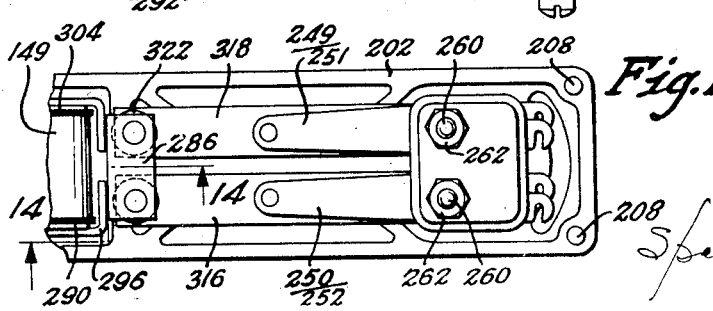

Patented Dec. 22, 1942

2,306,002

UNITED STATES PATENT OFFICE 2,306,002

VOLTAGE TRANSFORMATION APPARATUS

Raymond H. Sullivan, William H. Hutchins, and Cyril T. Wallis, Rochester, N. Y., assignors, by mesne assignments, to General Motors Corporation, Detroit, Mich., a corporation of Delaware Application October 2, 1933, Serial No. 691,786

16 Claims. (Cl. 171—97)

This invention relates to voltage transformation apparatus, and more particularly to a device and circuit for transforming the voltage from a direct current source such as a battery.

Quite a number of mechanical devices have been devised for accomplishing a similar purpose, but due to the mechanical structure, and the circuit connections of these devices, their life has been short, and their efficiency low. Beside these faults, the devices have been quite noisy. Furthermore, some of the previous devices utilized rectifier tubes, which tubes were a source of a large amount of troubles.

One particular field in which an efficient and durable apparatus of this type finds utility, although the present invention is not limited thereto, is in the elimination of the "B" batteries for automobile radio sets. In such an application, the apparatus is called upon to efficiently produce high voltage direct current from the low voltage storage battery source.

It is an object of this invention to provide a mechanical interrupting and rectifying device for producing a high direct-current potential from a low potential direct-current source.

Another object of this invention is to provide direct-current voltage transformation apparatus that is not only durable and efficient in operation, but is also low in production cost.

Another object of this invention is to provide apparatus for interrupting, transforming and rectifying the voltage from a direct current source that may be confined in a small space.

Another object of this invention is to provide apparatus employing mechanical means for interrupting and rectifying potentials, which apparatus is comparatively quiet in operation.

Another object of this invention is to provide apparatus employing a vibrating reed for actuating contacts for both interrupting a direct current potential before it is transformed and rectifying the transformed potential, which apparatus embodies means for minimizing the sparking at the contacts and increasing the operating efficiency of the apparatus.

Another object of this invention is to provide mechanical, as well as electrical means, for improving the efficiency and operation of apparatus for interrupting, transforming and rectifying the potential provided by a direct current source.

Further objects and advantages of the present invention will be apparent from the following description, reference being had to the accompanying drawings wherein a preferred embodiment of one form of the present invention is clearly shown.

In the drawings:

Fig. 9 is a top cutaway view of a preferred form of structural embodiment of a vibrator device for use with the circuit shown in Fig. 4, which view is taken substantially in the direction of the arrows and on the line 9—9 of Fig. 11.

Fig. 10 is a side sectional view taken in the direction of the arrows and substantially on a line 10—10 of Fig. 9.

Fig. 11 is a sectional view taken in the direction of the arrows and substantially on the line 11—11 of Fig. 9.

Fig. 12 is an exploded view of the principal parts of the device shown in Fig. 9.

Fig. 13 is a fragmentary top view illustrating a modification in the structure of the device shown in Fig. 9.

Fig. 14 is a fragmentary side view, also illustrating the modification shown in Fig. 13.

Figure 1:
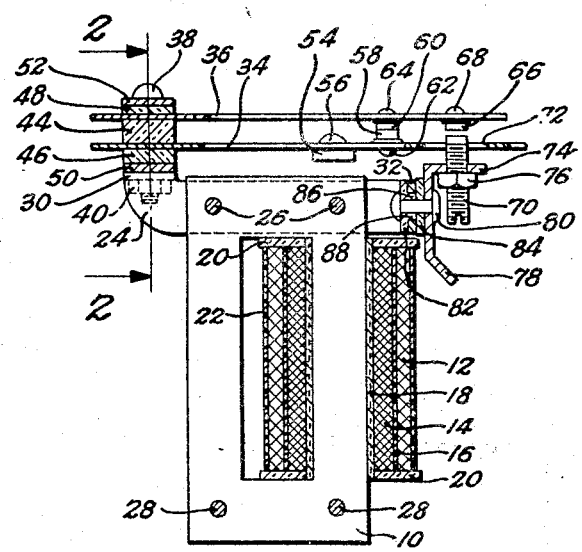
Fig. 1 is a side elevation of one form of structural embodiment of the present invention, having parts thereof shown in section.
Figure 2:
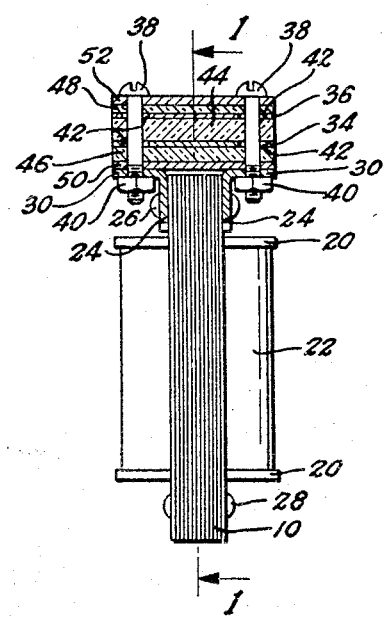
Fig. 2 is a view of the device shown in Fig. 1 taken substantially along the line and in the direction of the arrows 2—2 of Fig. 1.

With particular reference to Figs. 1 and 2, a laminated core 10, that is substantially rectangular in form, has a primary winding 12 and a secondary winding 14 on one leg thereof. The primary and secondary windings 12 and 14 respectively, are preferably separated by a layer of insulating material 16, and the secondary winding 14 is preferably separated from the core 10 by an insulating layer 18. The end surfaces of the windings 12 and 14 are protected by end members 20 that are preferably made of insulating material. The outer surface of the primary winding 12 is covered by a sheet of insulating material 22.

Support members 24 are secured to one end of the core by rivets or other suitable fastening means 26, which rivets or fastening means, together with rivets or other suitable fastening means 28, hold the laminations of the core together. The support members 24 extend beyond the core on either side thereof, and have bracket portions 30 and 32 formed on their respective ends.

Resilient contact carrying springs or reeds 34 and 36 are insulatingly secured to the bracket portions 30 by screws 38 having cooperating nuts 40, or other suitable fastening means, which screws or fastening means pass through suitable apertures 42 in the springs and are insulatingly spaced therefrom. The springs 34 and 36 are separated by an insulating spacer 44, and are insulated from the support and screw head by insulating spacers 46 and 48 respectively, which spacers 46 and 48 are preferably clamped between metallic reenforcing members 50 and 52. The resilient contact carrying springs 34 and 36 are supported so that they extend substantially parallel to each other, and substantially parallel to the leg of the core upon which the support members are mounted, and are thus substantially perpendicular to, and extend across, the end of the leg of the core upon which the windings are mounted.

The armature 54 of magnetic material is secured to the spring 34 by riveting as at 56, or by other suitable fastening means, and is preferably positioned on the spring 34 substantially opposite the end of the leg of the core upon which the windings are mounted. This armature 54, in addition to permitting the use of non-magnetic spring material, also provides for the concentration of the magnetic force or pull utilized to actuate the spring. Normally engaged and cooperating contacts 58 and 60 are secured to the springs 34 and 36 respectively, by riveting as at 62 and 64 respectively, or other suitable fastening means. Another contact 66 is secured to the spring 36 by riveting as at 68, or other suitable fastening means, and is preferably mounted farther from the spring support than is the contact 60. The contact 66 is normally disengaged from, but in alignment for engagement with, an adjustable stationary contact 70, which contact 70 projects through an opening 72 in the spring 34 and is spaced therefrom. Contact 70 is threadedly mounted in a bracket and terminal member 74 and has a lock nut 76 thereon for holding the contact in position after proper adjustment has been made. The bracket and terminal member 74 has a terminal portion 78, and is insulatingly secured to the bracket portion 32 by a rivet or other suitable fastening means 80. The insulating of the bracket and support member 74 from the bracket portion 32 is accomplished by insulating washers 82 and 84 intermediate the rivet 80 and bracket portion 32, and the bracket portion 32 and bracket and terminal member 74 respectively, and an insulating spacer 86 that is mounted in an aperture 88, and preferably integral with the washer 82, to insulatingly separate the rivet from the bracket portion 32.

In the mechanical operation of this device, the spring 36 is normally biased toward the spring 34 but has less force than the spring 34, so that when the spring 34 is moved toward the core 10 by magnetic force, the spring 36 will follow and keep the contacts 58 and 60 in engagement until motion of the spring 36 is arrested by the engagement of the contacts 66 and 70. The inertia of the spring 34 and armature 54 is such that it carries that spring beyond the point of engagement of the contacts 66 and 70 to break the contacts 58 and 60. The decay of the magnetic force that actuates the spring 34 permits the return of the spring 34 to engage the contacts 58 and 60 and break the contacts 66 and 70. In this particular design, the spring 34 extends beyond the contact 70 to provide the proper vibrating period and inertia in that spring.

Figure 3:
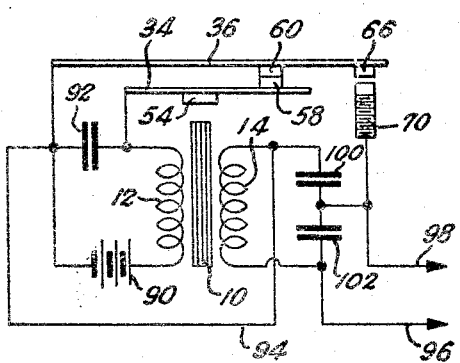
Fig. 3 is a circuit diagram of a preferred circuit utilized with the structure shown in Figs. 1 and 2.

With particular reference to Fig. 3, reference numerals similar to those previously used refer to similar parts. This figure, however, illustrates a preferred circuit for utilizing the structure previously described. A battery 90 has one terminal connected directly to one end of the primary winding 12, and its other terminal connected to the other end of the primary winding 12 through the resilient contact carrying springs 34 and 36 and the normally engaged contacts 58 and 60. A condenser 92 has its terminals connected to the resilient contact carrying springs 34 and 36. One end of the secondary winding 14 is connected through a lead 94 to the resilient contact carrying spring 36, while the other end of the secondary winding is connected to an output lead 96. The contact 70, that is engageable with the contact 66 on the spring 36, is connected to an output lead 98. The output leads 96 and 98 may be connected to any suitable circuit for utilizing the output potential. Condensers 100 and 102 are connected in series, and those condensers in series are connected across the secondary winding 14. The common terminal of the condensers 100 and 102 are connected to the output lead 98.

This circuit is particularly adaptable to the transformation of a potential provided by a direct current source such as the battery 90, and the rectification of the transformed potential with the same apparatus. The battery current is interrupted by the contacts 58 and 60, since those contacts are normally engaged so that a current flows through the primary winding 12 to produce a magnetic flux in the core 10, which flux produces an attracting force upon the armature 54 to move that armature and the resilient contact carrying spring 34 toward the core 10 to disengage or break the contacts 58 and 60. When the contacts 58 and 60 are broken, the circuit to the primary winding 12 is thereby open to stop the current flow through that winding and cause a decay of the magnetic flux in the core 10. Upon the decay of that flux, the energy stored in the resilient contact carrying springs 34 returns that spring to normal to again engage the contacts 58 and 60. The resilient contact carrying spring 34 preferably has sufficient inertia to carry the movement of that spring beyond the point at which the contacts 58 and 60 break, so that there is an appreciable interval of time between the breaking and making of those contacts. In addition to attracting the armature 54, the pulsating magnetic flux produced in the core 10 by virtue of the intermittent current flow in the primary winding 12 also creates an alternating potential in the secondary winding 14, which alternating potential has a magnitude principally dependent upon the ratio of the turns in the primary winding 12 to those in the secondary winding 14. Since one end of the secondary winding 14 is connected to the output lead 96 and the other end of the secondary winding 14 is intermittently connected to the output lead 98 through the resilient contact carrying spring 36 and the contacts 66 and 70, which spring is biased to follow the spring 34, so that the contacts 66 and 70 are engaged when, and only when the flux in the core 10 is decaying, a uni-directional current flow is obtained in the circuit connected to the leads 96 and 98. A half-wave rectifying action is thereby accomplished through the action of the contacts 66 and 70 and the resilient contact carrying spring 36.

It has been found that unless a means is provided to prevent or limit sparking at the contacts of this device, the burning or pitting of the contacts due to that sparking presents a serious detriment to the life and operation of the device, and considerably lowers the efficiency thereof. Hence, the capacity or condenser 92 is connected across the primary contacts 58 and 60, and the capacities or condensers 100 and 102 are connected in series and across the secondary winding 14. The values of these capacities or condensers were found to be somewhat critical for producing the best operating characteristics of the device, and what is believed to be a correct explanation of the function of these condensers and the circuit will be discussed later to suffice for both this and the following modified forms of the present invention.

Figure 4:
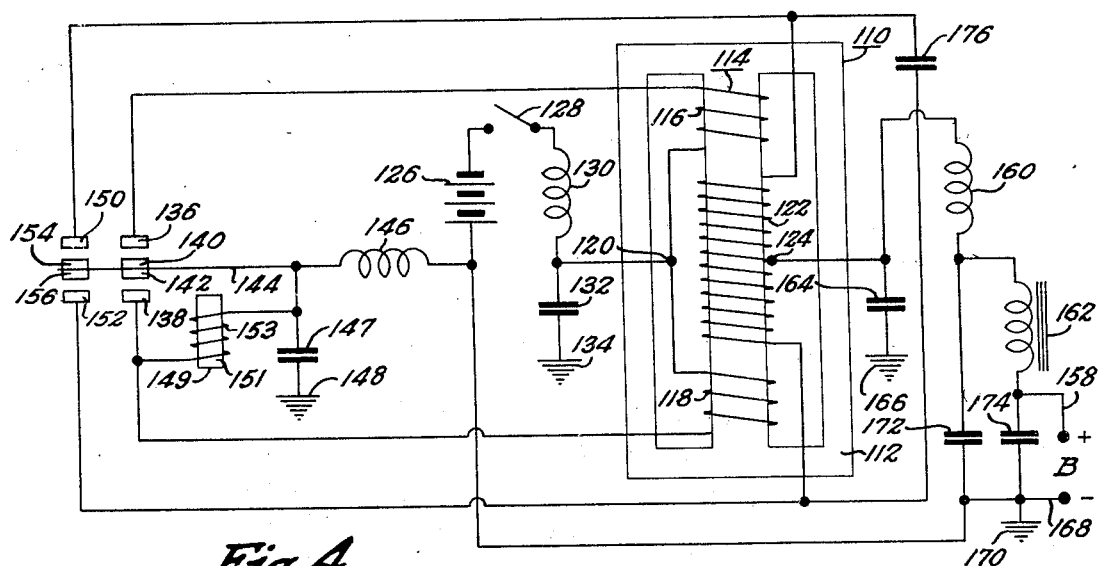
Fig. 4 is a circuit diagram of a preferred embodiment of the present invention.

With particular reference to Fig. 4, a transformer 110 has a core 112, a primary winding 114 that is preferably split so as to have sections 116 and 118 and the center tap 120, and a secondary winding 122 having a center tap 124. The center tap 120 of the primary winding is connected to one terminal of the battery 126 through a switch 128, and preferably through a choke coil 130. A condenser 132 is preferably connected to the primary center tap 120 and to ground at 134. The ends of the primary winding 114 are connected to contacts 136 and 138 respectively, which contacts are engageable with contacts 140 and 142 respectively, that are mounted on a resilient contact carrying spring or vibrating reed 144. The resilient contact carrying spring or vibrating reed 144, in this form, is normally unbiased so that the contacts are normally in a disengaged position. The spring or reed 144 is connected to the other terminal of the battery 126, preferably through a choke coil 146, and also to ground at 148 through a condenser 147. An electromagnet 149 has a core 151 in magnetic relation with the reed 144 and a winding 153 connected to the reed 144 and to the contact 138. The ends of the secondary winding 122 are connected to contacts 150 and 152, which contacts are alternately engageable with contacts 154 and 156 respectively. The contacts 154 and 156 are also mounted on the resilient contact carrying spring or vibrating reed 144, and electrically connected thereto. The secondary center tap 124 is connected to a suitable output lead 158 through a radio frequency choke coil 160 and an audio frequency choke coil 162, which choke coils are not particularly a part of the present invention, but rather provide part of a filter to adapt the device to be utilized for supplying potential to a device such as a radio receiver. A condenser 164 is connected to the center tap 124 and to ground at 166. One end of the choke coil 146 and one terminal of the battery 126 are connected to another suitable output lead 168 that is preferably grounded at 170. The output lead 168 is thereby connected to the spring or reed 144 through the choke coil 146. Condensers 172 and 174 are respectively connected to the ends of the audio frequency choke 162, and to the output lead 168, which condensers also form a part of the filter. A condenser 176 is connected across the secondary winding 122.

In the operation of this circuit, the spring or reed 144 is normally unbiased, so that the contacts 136 and 140, 142 and 138, 150 and 154, and 156 and 152 respectively, are normally disengaged. When the switch 128 is closed, a circuit is completed from one terminal of the battery 126 to the sections 116 and 118 of the primary winding 114 and through the section 118 and that switch and the choke coil 130 to one end of the electromagnet winding 153; and from the other terminal of the battery through the choke coil 146 to the other end of the electromagnet winding 153. The circuit thus formed to the electromagnet winding effects a current flow therethrough that attracts the reed 144 to effect engagement of the contacts 142 and 138 and 156 and 152 respectively. The engagement of the contacts 142 and 138 short circuits the electromagnet winding 153 to effect deenergization thereof and the consequent release of the reed 144, so that its resilience, deformation and mass carry it to a position to engage the contacts 140 and 136 and the contacts 150 and 154. Similar cycles of operation effect a vibration of the reed 144 at a rate dependent upon its natural period and thus alternate making and breaking of the contacts.

When the contacts 142 and 138 are closed, the current flow through the section 118 of the primary winding creates a flux that produces a potential in the secondary winding 122. This secondary potential is applied to the output lead 158 from the center tap 124, and to the output lead 168 through the contacts 156 and 152. Engagement of the contacts 136 and 140 closes a circuit through the section 116 of the primary winding after the disengagement of the contacts 142 and 138 opens the circuit through the section 118. The resulting flow of current through the section 116 of the primary winding creates a flux in a direction opposite to that which was created by the section 118. This, in turn, induces a potential in the secondary winding 122 opposite in polarity to that produced by the current in section 118. However, the potential applied to the output leads 158 and 168 is of the same polarity in this instance since the other end of the secondary winding is connected to the output lead 168 through the contacts 150 and 154.

The resistance of the electromagnet winding 153 is preferably high so that the current flow through the section 118 of the primary winding and the electromagnet while the contacts are open, as well as its shunt effect across the section 116, are not appreciably high with respect to the current flow through the sections 118 and 116 when the contacts 142 and 138 or 136 and 140 respectively, are closed.

In this form, as in the one previously described, it has been found that unless some means are provided for the prevention of sparking at the contacts, and the improvement of the efficiency of the device, that the sparking is detrimental to the life and operation of the unit and the efficiency is considerably reduced. Hence, the condenser 176 has been connected across the secondary winding 122 and this condenser, when its capacity is properly chosen, has been found to greatly reduce sparking of the contacts and to improve the efficiency of the circuit. It has also been found that by mounting the contacts 136 and 138 on resilient contact carrying members and adjusting the position of those contacts so that contact is made between the contacts 136 and 140 slightly before the contact is made between the contacts 150 and 154, and so that the contact between the contacts 138 and 142 is made slightly before the contact between the contacts 152 and 156, the characteristics and efficiency of the circuit are further improved and the capacity of the condenser 176 somewhat different for best results.

Factors in the design of the component parts of the circuit also have been found to be important to the satisfactory and efficient operation of the circuit. For instance, a proper vibrator frequency must be chosen so that a balance is obtained between the decreased transformer size at higher frequencies, the greater ease of filtering at the higher frequencies, and the amplitude of the reed vibrations obtainable with a satisfactory reed. Raising the vibratory frequency naturally decreases the amplitude of vibration for a given vibrator, and makes the adjustments of the contacts closer and more difficult to maintain. A frequency of about 140 vibrations per second has been found to be satisfactory in the present instance, although the invention is not deemed to be limited to any particular value.

It is believed apparent that if the transformer core is small and the primary inductance low, the rate of change of current and flux in the primary circuit will be rapid, while if the core is made larger and the primary inductance increased, the rate of change of current in the primary circuit upon closing the contacts will be reduced. This inductance must also be made complementary to the vibrator speed so that the contacts will open before the current in the primary circuit reaches a steady value, so that the battery current will not be consumed and dissipated as heat without producing a change in flux to generate voltage in the secondary winding. Also, if the primary inductance is too low, sparking occurs because of the primary current magnitude unless the resistance of the primary winding is made high enough to reduce that current magnitude; and such increase in resistance is undesirable because of the reduced efficiency caused thereby. If the primary inductance is too high, the delay caused thereby in the current build-up lowers the efficiency, because the breaking of the primary contacts occurs too low on the curve of primary current build-up.

To make the operation of the condensers 92, 100 and 102, and the condenser 176 more clear to those skilled in the art, and to explain more fully how the reduced contact sparking and increased efficiency are obtained through the use of those condensers, the following discussion, together with approximate mathematical representations, are herein presented. When the primary vibrator contacts close, the impressed battery voltage is consumed by the voltage drop of the primary current flowing through the resistance of the primary winding, and the counter E. M. F. generated in the primary winding. To express this in the form of equations, let:

$E_p$ = primary impressed voltage.
$e_p$ = primary counter E. M. F.
$R_p$ = primary resistance.
$i_B$ = primary magnetizing current.

Then
$$E_p = e_p + i_B R_p \quad (1)$$

In a well designed transformer, the flux density is kept low to reduce the iron losses. Therefore, $i_B$, the primary current at flux density (B), will be small. The primary resistance $R_p$ is also kept as low as possible in order to reduce the primary copper loss. Hence, the product $i_B R_p$ is generally so small that it may be neglected without having practical effect on the calculations. (1) then becomes:

$$E_p = e_p \quad (2)$$

Since $E_p$ is the impressed battery voltage, and is constant, the counter E. M. F. generated by the changing magnetic field must be constant in order to equal $E_p$ at any instant.

The voltage generated in the primary coil of $N_p$ turns, at any instant after the contacts close, is:

$$e_p = -\frac{N_p}{10^8}\frac{d\phi}{dt} \quad (3)$$

When the contacts open:

$$e_p = +\frac{N_p}{10^8}\frac{d\phi}{dt} \quad (4)$$

Where $\phi$ is the maximum flux in one direction, and $t$ is the time in seconds that the primary contacts are closed in each direction. The (+) and (−) signs in the voltage equations show that the counter E. M. F. generated in the primary at any instant is opposing the voltage $E_p$ when the field is building up and is in the same direction as $E_p$ when the field is decreasing in strength.

In order to generate a constant E. M. F., $e_p$, the instantaneous rate of change of magnetic flux with time, that is, $$\frac{d\phi}{dt}$$

must be constant. Therefore, $$e_p = \frac{+N_p \phi}{-10^8 t} \quad (5)$$

At the end of the first alternation, the magnetic field is built up to its maximum value, $\phi$, in one direction. After the contacts open, and the magnetic field ceases to increase, a second pair of contacts closes the circuit to another similar primary coil wound on the same magnetic circuit as the first coil. This second coil is wound so as to reverse the direction of the magnetic field. Therefore, at the end of the second alternation, the magnetic field has changed from a maximum value in one direction to a maximum value in the opposite direction. From this it will be seen that from the end of the first alternation to the end of the second alternation, or a duration of one-half cycle, a total flux change due to the magnetic fields of both primary windings is $2\phi$. Then, after the first alternation, the voltage generated in either primary winding in the following alternation is:

$$e_p = \frac{+2N_p \phi}{-10^8 t} \text{ volts} \quad (6)$$

Since
$$\phi = BA \quad (7)$$
Where
$B$ = flux density in lines per square inch, and
$A$ = the effective area of the magnetic circuit in square inches.

Substituting (7) in (6):

$$e_p = \frac{+2N_p BA}{-10^8 t} \quad (8)$$

Solving (8) for $N_p$:

$$N_p = \frac{10^8 e_p t}{2BA} \text{ turns on each primary coil} \quad (9)$$

Where Kp is a constant of the vibrator which represents the amount of each alternation that the primary contacts are closed, and $f_v$ is the vibrator frequency in cycles per second:

$$t = \frac{K_p}{2f_v} \quad (10)$$

Substituting (10) in (9):

$$N_p = \frac{10^8 e_p K_p}{4BAf_v} \quad (11)$$

Letting
$i_B$ = current in amperes at a flux density B
$l$ = the mean length of magnetic circuit.

$$\frac{iN}{l}$$

= the ampere turns per inch required to produce B, and shown on the B—H curve of the steel to be used.

$$i_B = \frac{\left(\frac{iN}{l}\right)_B l}{N_p} \quad (12)$$

The inductance of each primary coil is:

$$L_p = \frac{\phi N_p}{10^8 i_B} \text{ henries} \quad (13)$$

$$\phi = 3.2 \, i_B N_p \frac{uA}{l} \quad (14)$$

Where $u$ = the permeability of the iron.
Substituting (14) in (13)

$$L_p = \frac{3.2 \, N_p^2 uA}{10^8 l} \quad (15)$$

It may be seen from Equation 15 that the primary inductance is dependent upon the number of primary turns, the permeability of the core iron, the area of the core and the mean length of the magnetic circuit. Then, since in this apparatus, the primary contacts are broken when the magnetic field in the magnetic circuit is at maximum, there is magnetic energy stored in the magnetic circuit because that magnetic field which has been built up must collapse, and in collapsing will generate a voltage in the transformer windings. The value of that stored magnetic energy may be expressed approximately as follows:

$$w_m = \frac{1}{2} L_p i_B^2 \quad (16)$$

Unless some means is provided for storing this magnetic energy during the interval of time between the opening of one set of primary contacts and the closing of the other set, that energy will dissipate itself in the form of a destructive arc between the contacts. However, by connecting a condenser of the proper size across the secondary winding, this magnetic energy is absorbed by the condenser at a rate that will prevent a destructive voltage being generated.

The frequency of energy transformation from magnetic to electrostatic energy is:

$$f_e = \frac{1}{2\pi \sqrt{L_c C_2}} \quad (17)$$

The time required for one-quarter cycle of the electric wave is:

$$T_e = \frac{1}{4f_e} = \frac{\frac{1}{4}}{2\pi \sqrt{L_c C_2}} = \frac{\pi}{2} \sqrt{L_c C_2} \quad (18)$$

Where
$L_c$ = the inductance of both secondary coils in henries.

$C_2$ = the effective capacity in farads connected across both secondary coils.

$$L_c = \frac{(2N_s)^2}{N_p^2} = \frac{4N_s^2}{N_p^2} \quad (19)$$

Where $N_s$ = the number of secondary turns.

The maximum or peak value of the voltage across the secondary winding and the secondary condenser is determined by the amount of energy stored in the magnetic circuit and the capacity of the secondary condenser.
That is from (16) we have:

$$w_m = \frac{1}{2} L_p i_B^2 \quad (16)$$

After the energy is transferred to the condenser, $$w_e = \frac{1}{2} C_2 e_c^2 \quad (20)$$

Where $e_c$ = the maximum or peak voltage across the transformer and condenser. Since the magnetic and electrostatic energies are the same, and changed in form only, assuming negligible resistance:

$$w_e = w_m \quad (21)$$

and $$\frac{1}{2} C_2 e_c^2 = \frac{1}{2} L_p i_B^2 \quad (22)$$

$$e_c = \sqrt{\frac{L_p}{C_2} i_B^2} \quad (23)$$

It may be seen from Equations 23 and 18 that the capacity of the condenser across the secondary must be properly chosen to control the rate of voltage rise in proper relation to the separation of the contacts, so that the voltage per unit opening of contacts will not exceed a point where destructive arcing would occur. The energy thus transformed from electromagnetic energy to electrostatic energy is then again transformed when the contacts are closed for the following half cycle and utilized as magnetic energy since the condenser discharge current aids the current of the following half cycle. It is easily understood that substantially the same result can be obtained by connecting a condenser across the primary winding rather than across the secondary winding.

Besides merely storing the magnetic energy in the form of electrostatic energy, then, it may be seen that the function of the condenser, or condensers, is also to adjust the time constant of the secondary circuit to synchronism with that of the primary. Furthermore, in apparatus such as that shown in Figs. 3 and 4, where a single vibrating member is utilized to actuate both the interrupting and rectifying contacts, and the interruptions of the secondary circuit have a definite relation with those of the primary circuit, it is necessary for obtaining the best efficiency with the apparatus, and the minimum sparking at the secondary contacts, that the points of zero potential or current of the secondary circuit occur at the time when those contacts are broken. Whether it is the point of zero potential or current, or both that must be considered is dependent somewhat upon the type of load with which the apparatus is used. The condenser or capacity connected in the circuit of the apparatus, and previously described, serves this purpose.

It has been found, however, that if the contacts are so spaced that the primary contacts make somewhat before the secondary contacts make, and consequently the secondary contacts break somewhat before the primary contacts break, even better efficiency and results are obtained when a condenser of the proper value is used, than when the capacity alone is depended upon to solve the problem.

Figure 8:
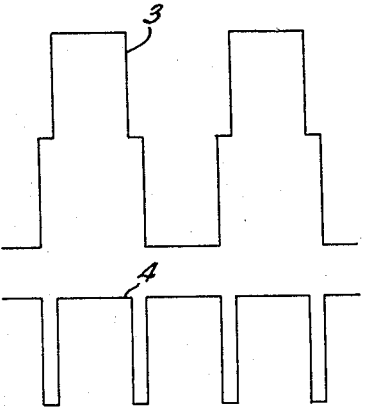
Fig. 8 shows illustrative curves that indicate approximate flux end voltage waves for illustrating the operation of the circuit shown in Fig. 4.

Referring to Fig. 8, the operation of the apparatus shown in Fig. 4 may be approximately visualized from the curves. If the effects of hysteresis and the condenser or condensers are neglected, the curve of flux variation might be assumed to be similar to that illustrated by the curve 1. However, because of the flux lag due to hysteresis, and the additional flux produced by the current flow resulting from the energy stored in the condenser or condensers, the resultant flux follows a curve that is approximated by the curve 2. This flux produces a voltage wave in the secondary winding that is approximated by the curve 3. Then, when that voltage wave is rectified, it assumes the shape approximately as shown by curve 4.

Figure 5:
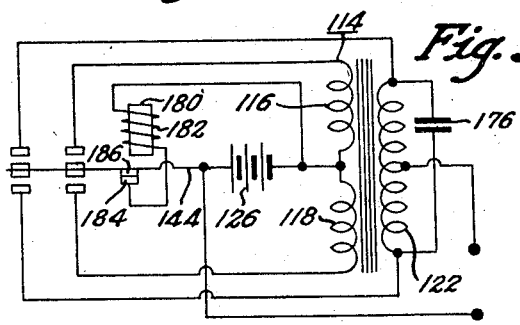
Figs. 5, 6 and 7 are circuit diagrams illustrating modifications of the circuit shown in Fig. 4.

In the modification shown in Fig. 5, a different means has been illustrated for controlling the electromagnet that actuates the vibrating reed. In this form, an electromagnet 180 has a winding 182 connected across the battery 126 in series with contacts 184 and 186, one of which contacts is controlled by the vibrating reed 144. When the contacts 184 and 186 are engaged, the electromagnet urges the reed in a direction which disengages the contacts 184 and 186 to open the circuit to the electromagnet and allow the reed to return. In this figure, as well as in Figures 6 and 7, reference numerals similar to those used in Fig. 4 refer to similar parts.

Figure 6:
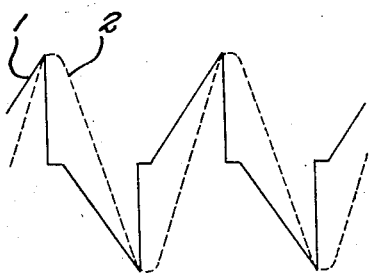
Figure 6:
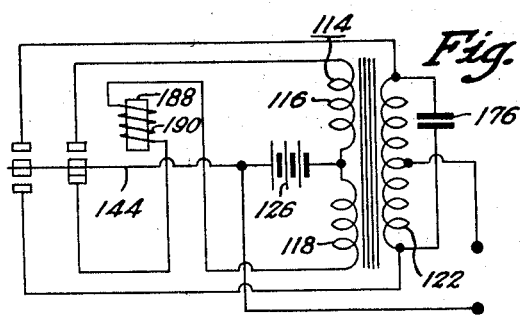

In the form shown in Fig. 6, an electromagnet 188 has a winding 190 that is preferably a low resistance winding. The winding 190 is connected in series with one section of the primary winding 114 so that the current flow to the electromagnet is controlled by the same contacts that control the flow to the primary winding section with which it is in series.

Figure 7:
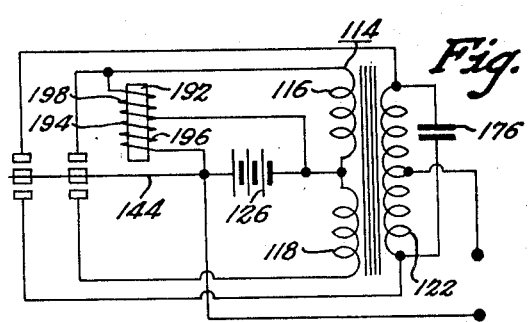

In the form shown in Fig. 7, an electromagnet 192 has a winding 194, which winding is divided into sections 196 and 198. The section 196 is connected across the battery 126, while the section 198 is connected across the section 116 of the primary winding 114. The contacts 138 and 140, in this form, are normally disengaged, and the section 196 of the electromagnet winding attracts the reed until the contacts 138 and 140 become engaged, at which time a current flow causing a bucking flux is set up in the section 198 of the electromagnet winding. This bucking flux so weakens the total electromagnet flux that the reed is released.

In Figs. 9, 10, 11 and 12, the structure of the preferred form of vibrator unit, to be used in a circuit such as that shown in Fig. 4, is illustrated. In these figures, reference numerals similar to those previously used refer to similar parts. In this structure, an enclosure 200 is provided by a base 202 that is preferably made of brass or some material having a comparatively low temperature coefficient of expansion, and a cooperating cover 204 that is preferably made of lead or some other comparatively good sound deadening material. A gasket 206 of paper or some similar material is preferably utilized between the adjoining surfaces of the base 202 and cover 204 to provide for deadening the sound of the vibrating parts. The cover 204 is held in position on the base 202 preferably by pins such as 208 that fit into apertures such as 210 and 212 in the base 202 and cover 204 respectively. A mounting pedestal 214 is preferably integrally formed with the base 202, which pedestal has a recess or groove 216, a recess 218 and an aperture 220 therein. This pedestal 214 provides a mounting for the contact and vibrator assembly.

The contact and vibrator assembly comprises metallic spacers 222, 224, 226, 228, 230 and 232; insulating spacers 234, 236, 238, 240, 242 and 244; and metallic shims 246 and 248; as well as resilient contact carrying springs 249, 250, 251 and 252; contact spring reenforcing and stop members 253, 254, 255 and 256; and the vibrating reed 144. This assembly is held in position by a pin 258 of insulating material, and clamped together by screws 260 having cooperating nuts 262 and washers 264, or other suitable fastening means. The screws 260 are insulated from the metallic parts of the assembly by insulating sleeves or spacers 266 that fit over the screws and pass through the assembly. The insulating spacers 234, 236, 238, 240, 242 and 244 separate the current carrying parts of the assembly so that they are thereby insulated from each other. The contact carrying springs 251, 252, vibrating reed 144 and contact carrying springs 249 and 250 have, respectively, projecting therefrom at the end thereof opposite to the contacts, terminal portions 270, 272, 274, 276 and 278, which terminal portions are provided for making circuit connections to the contacts.

The vibrating reed 144 has apertures 280 and 282 therein, which apertures, it has been found, are beneficial in reducing the operating noise of the vibrating reed. Also beneficial to the reduction of noise of the vibrating reed, is a layer of cloth or paper or similar textural or fibrous material 284, preferably wound around the vibrating reed and secured thereto. The position of this layer of material is preferably near the free end of the reed. An armature 286 of magnetic material is secured to the end of the vibrating reed by rivets 288 or other suitable fastening means.

The electromagnet 149 is secured to the base 202 and supported by a bracket member 290, preferably in a position such that the axis of the core 151 is substantially parallel with the base, and substantially perpendicular to the longitudinal axis of the vibrating reed 144. The bracket 290 is secured to the base by rivets 292 or other suitable fastening means, and the electromagnet is preferably secured to the bracket by riveting end portions of the core 151 such as at 294. Also secured to the ends of the core 151 by the riveted portions 290 are angle members 296 of magnetic material that project toward each other outside of the electromagnet 149 and have an air gap between their ends so that they provide a partially complete magnetic circuit outside of the electromagnet. The magnetic angle members 296 are magnetically associated with the armature 286 for actuating the vibrating reed, and as viewed in Fig. 10, the upper surface of the members 296 is preferably even with or slightly below the lower surface of the armature 286, so that when the electromagnet is energized the armature and vibrating reed are moved downwardly by virtue of the magnetic force. The distance between the ends of the members 296 is adjustable by bending those members, so that the flux linking the armature may be somewhat controlled by adjusting that distance. The distance between the armature and the members 296 may also be adjusted by bending the members 296, and by the normal position of the vibrating reed 144. One of the important reasons for using a material of the base 202 which has a low temperature coefficient of expansion is to prevent appreciable variations in the distance between the members 296 and the armature 286 because of temperature changes. As a detail of construction of the electromagnet itself, it is preferable to separate the winding 153 from the core 151 by a layer of insulating material 300 and to cover the electromagnet winding by a layer of insulating material 302, as well as to protect and support the ends of the winding by insulating members 304. The connections between the electromagnet winding 153 and its controlling contacts are made through suitable insulated leads 306 that pass through the groove or recess 216.

Even though considerable precaution has been taken in the design and construction of the vibrator unit itself for damping and eliminating noise, it is preferable, where very quiet operation is necessary, to mount the unit within a container 308 having a lid 310 that is held in place by screws 312 or other suitable fastening means, which container is preferably completely lined with the vibration damping and sound absorbing material 314, which may be sponge rubber or similar material.

In the modifications shown in Figs. 13 and 14, parts bearing reference numerals similar to those previously used are similar. However, in this form, separate vibrating reed members 316 and 318 are provided for interrupting the primary current and rectifying the secondary potential, respectively. These vibrating reeds 316 and 318 are insulatingly separated, but are tied together and kept in synchronism by the armature 286, which, in this instance, is insulated from the reeds 316 and 318 by insulating washers 320 and 322. This particular form of vibrator unit is preferable where it is desirable to segregate or insulatingly separate the primary and secondary circuits.

Since the operation of this vibrator unit has been discussed in connection with the circuit shown in Fig. 4, it is not believed necessary to go further into that at this point.

While the form of embodiment of the present invention as herein disclosed, constitutes a preferred form, it is to be understood that other forms might be adopted, all coming within the scope of the claims which follow.

What is claimed is as follows:

1. In combination, a transformer and vibrating means for interrupting a primary current and for rectifying a secondary voltage, and means for bringing the points of zero current of the secondary current substantially into phase with the points of interruption of the primary current.

2. In combination with a voltage change device, a vibrating means having a single magnetic vibrator motor, and provided with series contacts for interrupting a primary current and for rectifying an alternating secondary voltage, and means for bringing the points of zero current value of the secondary current substantially into phase with the interruptions of said primary current.

3. In combination with a voltage change device, a vibrating means having a single magnetic vibrator motor, and provided with series contacts for interrupting a primary current and for rectifying an alternating secondary voltage, and means for bringing the points of zero current value of the secondary current substantially into phase with the interruptions of said primary current, said means comprising a capacity shunting said secondary circuit.

4. In combination, a transformer and vibrating means for interrupting a primary current and for rectifying a secondary voltage, said vibrating means being unitary, and means for changing the phase of the secondary current to bring its point of zero current into phase with the points of interruption of the primary current so as to permit simultaneous interruption and rectification.

5. In combination with a transformer having a tapped primary and a tapped secondary, a vibrator device having motive means connected to a source of primary current and a set of contacts to cause the flux in said transformer to vary from a positive to a negative value periodically, a second set of contacts connected with the secondary of said transformer to rectify the secondary voltage, and means for causing the contact changes of said rectifying means to occur in substantial synchronism and phase with the points of zero current of the secondary transformer current.

6. In combination with a voltage change device, a vibrating means having a magnetic vibrator motor, and provided with series of contacts for interrupting a primary current and for rectifying an alternating secondary voltage, mechanically adjustable means and electrical means for improving the operating efficiency of the combination.

7. In combination with a voltage change device having primary and secondary windings, a vibratory means having a magnetic vibrator motor, and provided with series of contacts for interrupting a primary current and for rectifying an alternating secondary voltage, mechanical adjustable means for effecting a time difference between the making of the rectifying contacts and the making of the primary current interrupting contacts.

8. In combination with a transformer having a tapped primary winding and a tapped secondary winding, a vibrator device having motive means connected into a source of primary current and a set of contacts to cause the flux in said transformer to vary from a positive to a negative value periodically, a second set of contacts connected with the secondary of the transformer to rectify the secondary voltage, and means for causing the contact changes of said rectifying means in substantial synchronism with the points of zero current of the secondary transformer current, said means comprising a condenser connected to one of the transformer windings and adjustable contact carrying members adjusted so that the contacts that cause the flux variations break after the contacts that rectify the secondary voltage.

9. In combination with a transformer, a magnetic vibrator having a reed, contacts arranged to vibrate with said reed for interrupting a primary current to said transformer and for rectifying a secondary voltage from said transformer, a capacity connected across the secondary of said transformer of sufficient value to shift the phase of the secondary current thereof to a degree such that the points of zero value of said secondary current are brought into substantial synchronism with the points of interruption of the said primary current.

10. In combination with a transformer having primary and secondary windings, a series of contacts for interrupting a primary current, a second series of contacts for rectifying an alternating secondary current, motive means for actuating said several series of contacts substantially in synchronism and means for bringing the zero value of said secondary current substantially into synchronism with the interruption of said primary current.

11. In combination with a transformer having primary and secondary windings, a series of contacts for interrupting a primary current, a second series of contacts for rectifying an alternating secondary current, motive means for actuating said several series of contacts substantially in synchronism and means for bringing the zero value of said secondary current substantially into synchronism with the interruption of said primary current, said means comprising a capacity connected across the secondary winding of the transformer.

12. In combination with a voltage change device, a vibrating means having a magnetic vibrator motor, a plurality of normally separated contacts for interrupting a primary current and for rectifying an alternating secondary voltage, said contacts being brought into and out of engagement by action of the vibrator motor, mechanically adjustable means and electrical means for improving the operating efficiency of the combination, said mechanically adjustable means comprising mechanism by means of which certain of said contacts are spaced at different distances from each other.

13. In combination with a voltage change device, a vibrating means having a magnetic vibrator motor, a plurality of normally separated contacts for interrupting a primary current and for rectifying an alternating secondary voltage, said contacts being brought into and out of engagement by action of the vibrator motor, mechanically adjustable means and electrical means for improving the operating efficiency of the combination, said mechanically adjustable means comprising mechanism by means of which certain of said contacts are spaced at different distances from each other and for variably adjusting said distances as desired.

14. In combination with a voltage change device, a vibrating means having a magnetic vibrator motor, a plurality of normally separated contacts for interrupting a primary current and for rectifying an alternating secondary voltage, said contacts being brought into and out of engagement by action of the vibrator motor, mechanically adjustable means for effecting a time difference between the making of the rectifying contacts and the making of the primary current interrupting contacts, said last named means comprising mechanism by means of which the primary and secondary contacts are positioned at different distances apart.

15. In combination with a transformer having primary and secondary windings, a plurality of fixed contacts connected to said primary and secondary windings, a vibrating element operable by a magnetic vibrator motor and having primary and secondary contacts thereon adapted to cooperate with the fixed primary and secondary contacts and normally spaced therefrom and mechanical means for adjusting the spacing of the primary contacts differently from the spacing of the secondary contacts, whereby a time difference between the making of the primary and secondary contacts is effected.

16. In combination with a transformer having primary and secondary windings, a plurality of fixed contacts connected to said primary and secondary windings, a vibrating element operable by a magnetic vibrator motor and having primary and secondary contacts thereon adapted to cooperate with the fixed primary and secondary contacts and normally spaced therefrom and mechanical means for adjusting the spacing of the primary contacts differently from the spacing of the secondary contacts and for varying the spacing of said contacts as desired, whereby a time difference between the making of the primary and secondary contacts is effected.

RAYMOND H. SULLIVAN.
WILLIAM H. HUTCHINS.
CYRIL T. WALLIS.